Figure 1:
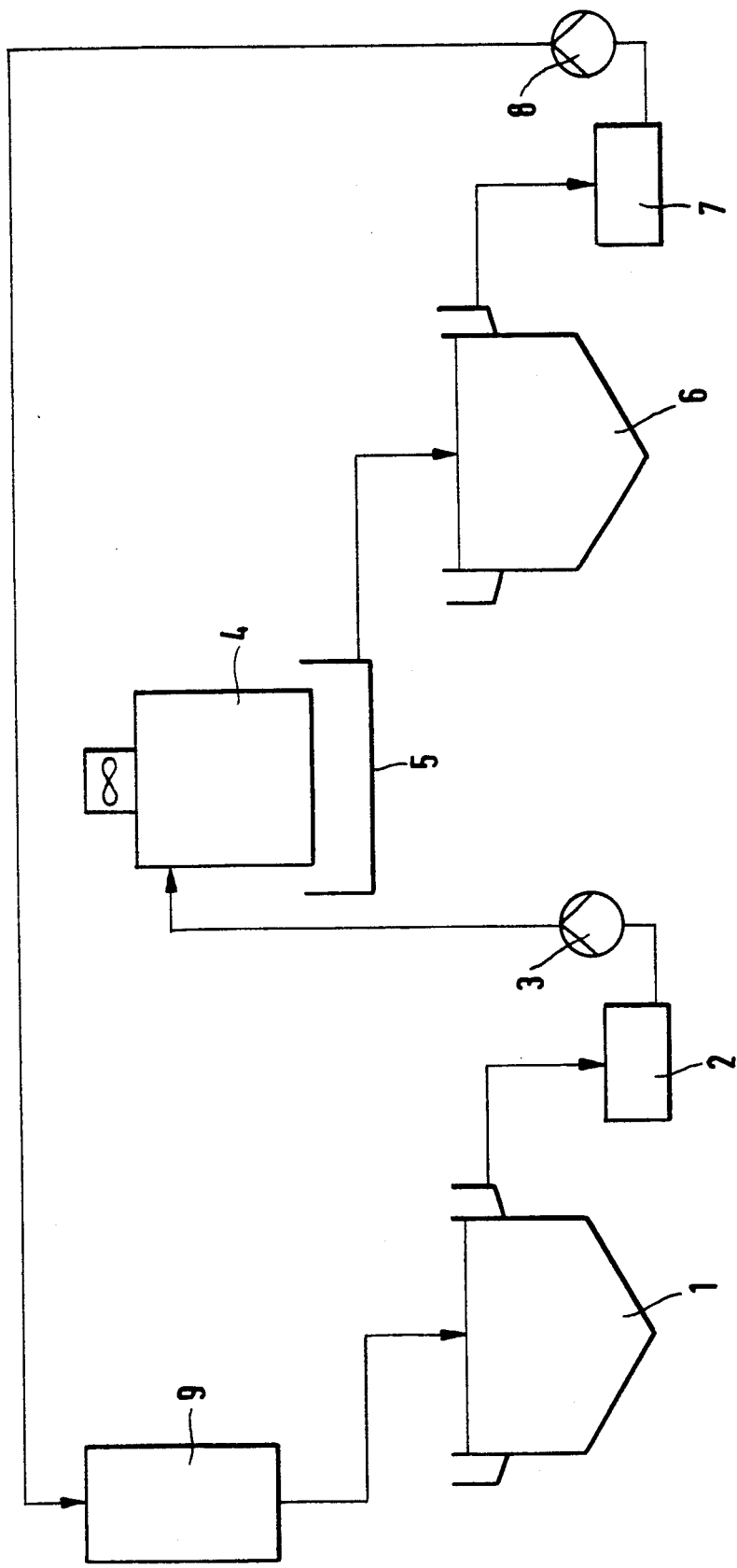

United States Patent [19]

Vuletic

[11] Patent Number: 5,225,086
[45] Date of Patent: Jul. 6, 1993

[54] PROCESS FOR THE TREATMENT OF WASH WATER FROM THE GAS WASHING SYSTEM OF AN IRON ORE REDUCTION PLANT

[75] Inventor: Bogdan Vuletic, Düsseldorf, Fed. Rep. of Germany

[73] Assignee: Deutsch Voest-Alpine Industrieanlagenbau GmbH, Dusseldorf, Fed. Rep. of Germany

[21] Appl. No.: 776,603

[22] Filed: Oct. 11, 1991

[30] Foreign Application Priority Data

Oct. 11, 1990 [DE] Fed. Rep. of Germany ....... 4032288

[51] Int. Cl.$^5$ .................................. C02F 1/74
[52] U.S. Cl. ................................... 210/712; 210/718; 210/722; 210/737; 210/774; 210/195.1; 210/175; 210/180; 210/188; 210/202; 55/72; 55/84; 55/84; 55/228; 261/DIG. 11
[58] Field of Search .............. 210/718, 722, 180, 188, 210/750, 195.1, 167, 712, 202, 737, 175; 55/228, 72, 84, 85; 261/DIG. 11

[56] References Cited

U.S. PATENT DOCUMENTS

| | | |
|---|---|---|
| 2,128,617 | 8/1938 | Lawlor . |
| 3,396,514 | 8/1968 | Hurst et al. ............... 55/228 |
| 3,613,333 | 10/1971 | Gardenier ................. 55/228 |
| 3,635,000 | 1/1972 | Brown ....................... 55/228 |
| 3,733,788 | 5/1973 | Crowley .................... 55/228 |
| 4,288,328 | 9/1981 | Montgomery ............. 210/718 |
| 4,318,716 | 3/1982 | Doerges et al. ............. 55/48 |
| 4,632,766 | 12/1986 | Firnhaber et al. ......... 210/760 |

Primary Examiner—Stanley S. Silverman
Assistant Examiner—Neil M. McCarthy
Attorney, Agent, or Firm—Locke Reynolds

[57] ABSTRACT

The invention relates to a process for the treatment of wash water from the gas washing system of an iron ore reduction plant, the wash water being brought into direct contact with dust-laden gas in a gas washer, is removed from the latter and after solids separation is again supplied in cooled form to the gas washer. According to the invention this problem is solved in that wash water which is substantially freed from solids in a concentrator or thickener (1) is passed via a hot water tank (2) into a cooling tower (4) where the water is cooled and where there is simultaneously a separation of dissolved carbon dioxide, an enrichment with oxygen, a conversion of the calcium and magnesium hydrogen carbonates into carbonates and iron bicarbonate, as well as iron sulphate into iron(III)-hydroxide and that said chemically destabilized wash water is freed from the re-formed and residual solids in a further series-connected thickener (6) by adding flocculating and coagulating agents, is chemically stabilized and passed over a cold water tank (7).

14 Claims, 1 Drawing Sheet

PROCESS FOR THE TREATMENT OF WASH WATER FROM THE GAS WASHING SYSTEM OF AN IRON ORE REDUCTION PLANT

The invention relates to a process for the treatment of wash water from the gas washing system of an iron ore reduction plant, the wash water is brought into direct contact with the dust-laden gas in a gas washer, is removed from the latter and, after solids separation, is again supplied in cooled form to the gas washer.

German patent 26 54 579 corresponding to U.S. Pat. No. 4,318,716 issued Mar. 9, 1982, discloses a process for the regeneration of dust-laden washing liquids, in which the stripping gas stripped in a regenerating column, subsequently cooled and forming a condensate is supplied to a rewashing column, washed with water and drawn off. The bottom product of the rewashing column is subsequently subjected, together with a partial flow of the washing liquid, to an extraction process resulting in the separation of the constituents into a carbon-rich light phase and a heavy phase containing an organic solvent and water, the latter being resupplied to the regenerating tower. This process is complicated from the equipment standpoint and as a result of the gravity separation requires relatively long circulation times. Blockages and limestone deposits are not effectively avoided.

According to German patent 37 14 016, following gas washing, the dust-laden wash water is brought into contact with an oxygen-containing gas at approximately the same pressure at which the gas was washed and is then released to atmospheric pressure and the solids are deposited. There is a complete consumption of the oxygen during this wet oxidation of the contaminating substances.

This process is also unable to avoid depositing, hardening deposits of solids in the pipes. The necessary chemical conversion processes for cleaning wash waters from the gas washing system of an iron ore reduction plant cannot be obtained by jetting in water and air in a two-fluid nozzle. The process requires a separate stripper with sodium hydroxide solution and is costly to operate.

The purification of the water is very energy-intensive. It is therefore the problem of the present invention to give a process of the aforementioned type in which, without using additional energy for the atomization of the water, a complete chemical reaction of the content substances in a process takes place, whilst effectively avoiding deposits and encrustation by said reaction products in following pipes and washers.

According to the invention this problem is solved in that wash water which is substantially freed from solids in a concentrator or thickener is passed via a hot water tank into a cooling tower, where there is simultaneously a separation of dissolved carbon dioxide, an enrichment with oxygen, a conversion of the calcium and magnesium hydrogen carbonates into carbonates and iron bicarbonate, as well as iron sulphate into iron(III)-hydroxide. Said chemically destabilized wash water is then freed from the re-formed and residual solids in a further series-connected thickener by adding flocculating and coagulating agents, and is then chemically stabilized and passed over a cold water tank.

According to an advantageous development of the process, fresh water is supplied to the cold water tank in order to remove the hydrochemistry even further from the boiler scale formation area. As a result of the increased residence time in the thickener following the cooling tower, large quantities of iron-containing oxyhydroxy compounds, carbonates and dirt washed out from the cooling tower can be deposited.

A different ventilating unit can be used in place of the cooling tower.

The invention is described in greater detail hereinafter relative to an embodiment and the attached FIG. 1 illustrating the process in the form of a basic diagram.

The solids coming from the gas washer 9 are separated in the first solids concentrator 1. From there the water flows to the hot water tank 2 and is pumped by the cooling tower pump 3 to the cooling tower 4, where the water is cooled and part of the dissolved salts is converted into solids. From the cooling tower zone 5 the water flows to the second solids concentrator 6, where the re-formed solids are separated. From there the conditioned water flows to the cold water tank 7 and is subsequently pumped by means of the initial water pump 8 to the gas washer 9.

The dust from the melt reduction and direct reduction plant contains large amounts of freshly reduced, highly reactive iron particles. In contact with carbon dioxide-saturated water iron bicarbonate is formed. This process is sped up and reinforced by increased pressure. The iron particles also react with sulphate ions to iron sulphate. In this way a large part of the solid iron particles is dissolved.

By expelling carbon dioxide and enriching the water with oxygen in the cooling tower 4 iron bicarbonate and iron sulphate lead to iron(III)-hydroxide, which is insoluble in water and is precipitated in flake form. The precipitated iron(III)-hydroxide flakes react with the oxygen present in the water and form solid iron oxides. These chemical processes lead to deposits and blockages in the water cycle.

In a melt reduction plant the dust also contains a large amount of calcium and magnesium oxide particles, which with the carbon dioxide-containing water in the gas washer form bicarbonates, which after ventilating in the cooling tower 4 are precipitated as carbonates and drastically increase the deposit and blocking problems in the cycle.

If this water with pronounced deposition tendencies and which is not in chemical equilibrium is pumped to the gas washer 9, there are pronounced deposits in the water cycle, mainly in the feed water pipes and washers and to avoid such deposits, following the cooling tower 4, the water is fed to the second solids concentrator 6, where the solid precipitation processes initiated in the cooling tower 4 are ended, the re-formed solids are separated and the water stabilized before being reused in the circuit.

As a result of the series-connected main components, i.e. the first solids concentrator 1, cooling tower 4 and second solids concentrator 6, specifically in the latter large quantities of iron-containing oxy-hydroxy compounds, carbonates and dirt washed out in the cooling tower can be dissolved out and separated by the use of flocculating and coagulating agents.

Thus, boiler scale formation is effectively prevented. A stable water quality on the supply side is guaranteed. By introducing fresh water into the cold water tank, further scale formation is effectively avoided. No additional pump is required for the connection in series of the second solids concentrator 6. From the cooling tower zone 5 the water is passed by gravity into the solids concentrator 6 and then into the cold water tank 7. If one solids concentrator fails the second thickener is used for the conventional purification of the wash water. No changes on existing cooling towers are required. While the invention has been illustrated and described in detail in the drawings and the foregoing description, the same is considered as illustrative and not restrictive in character, it being understood that only the preferred embodiment has been shown and described and that all changes and modifications that come within the spirit of the invention are desired to be protected.

I claim:

1. Process for the treatment of wash water from a gas washing system of an iron ore reduction plant, in which the wash water is brought into direct contact with dust-laden gas in one or more gas washers, is drawn from the gas washer and, following solids separation, is again supplied in cooled form to the gas washer, the process comprising the steps of passing wash water substantially freed from solids into a cooling tower, where there is simultaneously a separation of dissolved carbon dioxide, an enrichment with oxygen, formation of iron bicarbonate and iron sulfate, and conversion of said iron bicarbonate and iron sulfate into insoluble iron (III)-hydroxide, freeing said wash water from re-formed and residual solids by addition of flocculating and coagulating agents and cooling the wash water.

2. Process according to claim 1, wherein the step of cooling the wash water further comprises passing the wash water through a cold water tank.

3. Process according to claim 1, wherein the step of cooling the wash water further comprises passing the wash water through a ventilating unit.

4. The process according to claim 1 wherein said wash water is substantially freed from solids by concentrating said solids in a first solids concentrator directly following a gas washer cooling said wash water freed from said solids in a cooling tower positioned between the first and a second solids concentrator.

5. A process for the treatment of wash water from a gas washing system of an iron ore reduction plant in which wash water is brought into direct contact with dust-laden gas in one or more gas washers, is drawn from one gas washer and, following solids separation, is again supplied in cooled form to at least one of said one or more gas washers, the process comprising the steps of:

freeing the wash water from solids in a first solids concentrator;

passing said wash water from said first solids concentrator through a hot water tank to a cooling tower;

separating dissolved carbon dioxide from the wash water in said cooling tower;

simultaneously enriching said wash water with oxygen in said cooling tower;

simultaneously forming iron bicarbonates and iron sulfate in said wash water in said cooling tower;

simultaneously converting said iron bicarbonates and iron sulfate in said wash water into iron(III)-hydroxide in said cooling tower;

moving said wash water from said cooling tower to a second solids concentrator;

adding flocculating and coagulating agents to said wash water in said second solids concentrator; and cooling the wash water by passing said wash water over a cold water tank.

6. The process according to claim 5 wherein the adding step includes the step of freeing said wash water from any reformed or residual solids in said second solids concentrator.

7. The process according to claim 6 wherein said step of chemically stabilizing is accomplished by the step of passing said wash water over a cold water tank filled with fresh water.

8. A process according to claim 5 wherein the passing step is replaced by the step of passing said wash water from said first solids concentrator through a hot water tank to a ventilating unit.

9. Apparatus for the treatment of wash water from a gas washing system of an iron ore reduction plant in which wash water is brought into direct contact with dust-laden gas in one or more gas washers, is then drawn from one gas washer and, following solid separation, is again supplied in cooled form to at least one of said one or more gas washers, said apparatus comprising:

means for freeing the wash water from solids;

means for passing said wash water from said means for freeing to a means for cooling said wash water;

means for moving said wash water from said means for cooling to a means for adding flocculating and coagulating agents to said wash water; and means for cooling the wash water, said cooling means comprising a cold water tank.

10. The apparatus of claim 9 further comprising:

means for separating dissolved carbon dioxide from the wash water in sid means for cooling;

means for simultaneously enriching said wash water with oxygen in said means for cooling;

means for simultaneously forming iron bicarbonate and iron sulfate in said wash water in said means for cooling; and means for simultaneously converting said iron bicarbonate and iron sulfate in said wash water into iron(III)-hydroxide in said means for cooling 11. The apparatus of claim 10 wherein:

said means for freeing the wash water comprises a first solids concentrator connected to a gas washer;

said means for cooling the wash water comprises a cooling tower attached to said first solids concentrator; and said means for adding comprises a second solids concentrator attached to said cooling tower.

12. The apparatus of claim 11 further comprising a hot water tank attached between the first solids concentrator and the cooling tower wherein said wash water is passed from said first solids concentrator through said hot water tank to said cooling tower.

13. The apparatus of claim 12 further comprising a pump attached between said hot water tank and said cooling means and a second pump attached between said cold water tank and said gas washer.

14. The apparatus of claim 11 wherein said cooling tower is replaced by a ventilator.

* * * * *